United States Patent
Fang et al.

(10) Patent No.: US 11,098,685 B2
(45) Date of Patent: Aug. 24, 2021

(54) FUEL INJECTOR ASSEMBLY HAVING EXTERNAL FILTER AND METHOD OF MAKING SAME

(71) Applicant: Caterpillar Inc., Deerfield, IL (US)

(72) Inventors: Dianqi Fang, Dunlap, IL (US); Daniel Bumpus, Naperville, IL (US); Diego Caceres, Dunlap, IL (US); David Martin, Dunlap, IL (US); Sudhindra Ayanji, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 86 days.

(21) Appl. No.: 16/279,967

(22) Filed: Feb. 19, 2019

(65) Prior Publication Data

US 2020/0263648 A1 Aug. 20, 2020

(51) Int. Cl.
*F02M 61/16* (2006.01)
*B01D 29/11* (2006.01)
*B01D 35/00* (2006.01)

(52) U.S. Cl.
CPC ......... *F02M 61/165* (2013.01); *B01D 29/112* (2013.01); *B01D 35/005* (2013.01); *F02M 2200/27* (2013.01)

(58) Field of Classification Search
CPC .. B01D 29/112; B01D 29/31; F02M 2200/27; F02M 2200/8023; F02M 2200/8076; F02M 57/02; F02M 61/165
See application file for complete search history.

(56) References Cited

U.S. PATENT DOCUMENTS

| | | | | |
|---|---|---|---|---|
| 3,980,234 A | * | 9/1976 | Bouwkamp | F02M 61/12 239/533.11 |
| 4,453,671 A | * | 6/1984 | Hafner | F02M 69/043 239/124 |
| 5,238,192 A | * | 8/1993 | McNair | F02M 61/165 239/575 |
| 5,807,483 A | * | 9/1998 | Cassidy | B01D 29/15 210/232 |
| 6,257,203 B1 | * | 7/2001 | Lei | F02M 57/025 123/446 |
| 6,283,390 B1 | * | 9/2001 | Brendle | B23K 15/085 239/533.2 |

(Continued)

FOREIGN PATENT DOCUMENTS

| | | |
|---|---|---|
| DE | 102013203071 | 8/2014 |
| EP | 1030967 B1 | 8/2003 |

OTHER PUBLICATIONS

210111 DE102013203071 machine translation english—Dietmar (Year: 2013).*

(Continued)

*Primary Examiner* — Carl C Staubach
(74) *Attorney, Agent, or Firm* — Brannon Sowers & Cracraft

(57) ABSTRACT

A fuel injector assembly includes a fuel injector and an annular filter coupled with the fuel injector, the annular filter being snap-fitted with one of a nozzle case or an injector body of the fuel injector and slip-fitted with the other of the nozzle case or the injector body. The annular filter has a perforated wall forming a filtration screen covering an actuation fluid inlet formed in the nozzle case and positioned upstream of the actuation fluid inlet to trap particulates in incoming actuation fluid.

17 Claims, 4 Drawing Sheets

(56) References Cited

U.S. PATENT DOCUMENTS

| | | | |
|---|---|---|---|
| 6,446,885 B1 | 9/2002 | Bosch | |
| 6,536,417 B2 * | 3/2003 | Pearlman | F02M 55/005 |
| | | | 123/470 |
| 7,673,817 B2 * | 3/2010 | Brauneis | F02M 61/165 |
| | | | 239/575 |
| 9,644,589 B2 | 5/2017 | Stanadyne | |
| 10,830,196 B2 * | 11/2020 | Caceres | F02M 61/165 |
| 2001/0020467 A1 * | 9/2001 | Coldren | F02M 47/027 |
| | | | 123/511 |
| 2016/0220926 A1 | 8/2016 | Caceres | |
| 2017/0009718 A1 * | 1/2017 | Caceres | F02M 61/165 |
| 2017/0051714 A1 * | 2/2017 | Harcombe | F02M 61/165 |
| 2017/0306913 A1 * | 10/2017 | Krejci | F02M 57/023 |
| 2018/0209390 A1 | 7/2018 | Caceres | |

OTHER PUBLICATIONS

Aaron Brown, Specification and Drawings for U.S. Appl. No. 15/948,618 Perforated Integral Filter Sleeve for Fuel Injector and Fuel System Setup Method filed Apr. 9, 2018.

Aaron Brown, Specification and Drawings for U.S. Appl. No. 15/849,906 Fuel Injector Having Particulate-Blocking Perforation Array filed Dec. 21, 2017.

* cited by examiner

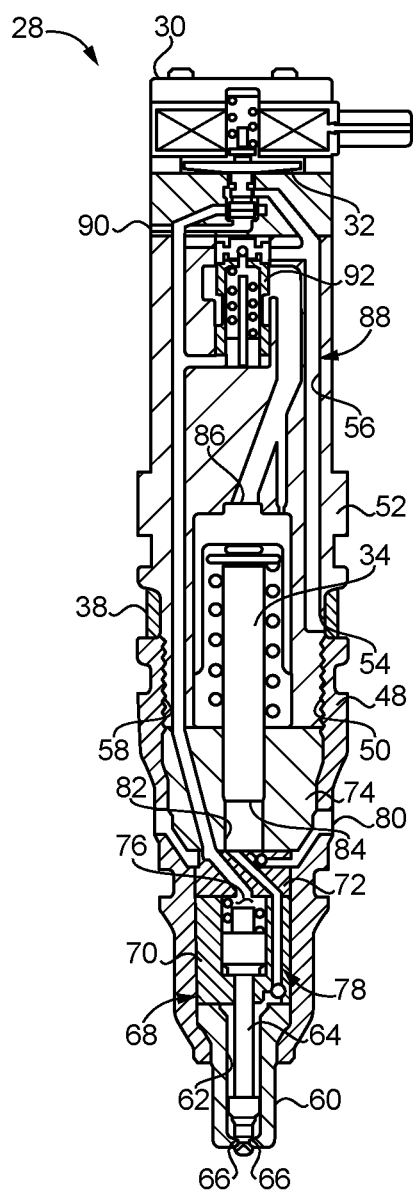
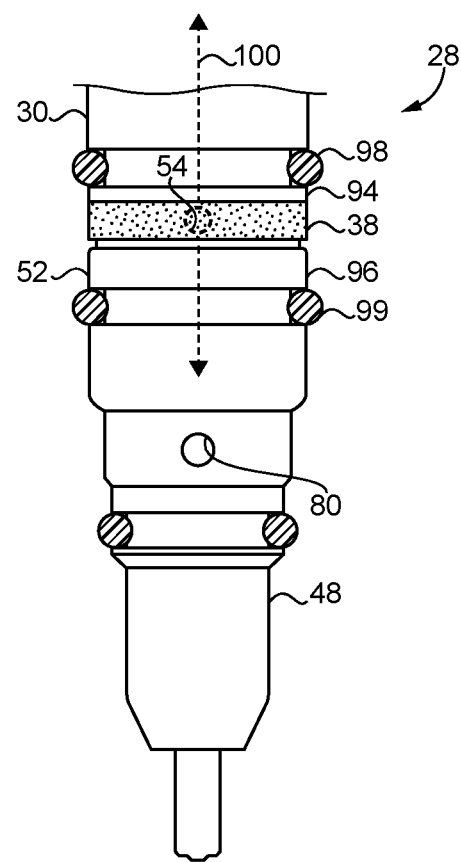
FIG. 2
FIG. 3

FUEL INJECTOR ASSEMBLY HAVING EXTERNAL FILTER AND METHOD OF MAKING SAME

TECHNICAL FIELD

The present disclosure relates generally to filtering particulates in actuation fluid for a fuel injector, and more particularly to positioning an annular filter forming a filtration screen about a fuel injector to trap particulates in incoming actuation fluid.

BACKGROUND

A wide variety of fuel systems for internal combustion engines are well-known and widely used, with many modern liquid fuel systems including a fuel injector for delivering metered quantities of a liquid fuel to an engine cylinder. An almost innumerable variety of fuel injector designs have been developed over the decades in an effort to optimize engine performance and operation in one or more ways. Innovation in this field remains robust as efforts to reduce emissions and improve efficiency has given rise to novel engineering challenges that have been the focus of much inventive effort. Emissions reduction strategies have led to fuel injector components and associated fuel system components such as pumps being precisely constructed and controlled to deliver consistent, accurate quantities of fuel.

Rapid movement of components, tight clearances, and other factors have led to the observation that fluids passed through fuel injectors for injection or for actuation should be relatively highly filtered to mitigate the risk of fine particulates making their way between or among moving parts. For example, tiny bits of metallic debris produced within a fuel injector, or in other apparatus supplying a fluid to a fuel injector, can cause parts to be damaged or degraded, ultimately impacting performance or even causing the parts to seize.

Various strategies have been proposed for limiting fuel injector components from exposure to potentially damaging particulates. U.S. Pat. No. 6,446,885 to Sims et al. discloses one known filter assembly for a fuel injector. In Sims, a filter is mounted on a needle valve assembly within the fuel injector, and includes holes for trapping particulates of a certain size. While the strategy set forth in Sims and others can prevent problems under certain conditions, there remains ample room for improvement and development of alternative strategies.

SUMMARY OF THE INVENTION

In one aspect, a fuel injector assembly includes a fuel injector having a nozzle case with a set of nozzle case threads, and an injector body. The injector body has formed therein an actuation fluid inlet and an actuation fluid passage extending in a downstream direction from the actuation fluid inlet. The injector body includes a set of injector body threads engaged with the set of nozzle case threads. The fuel injector assembly further includes an annular filter defining a longitudinal axis and including first axial end snap-fitted with one of the nozzle case or the injector body, and a second axial end slip-fitted with the other of the nozzle case or the injector body. The annular filter further includes a perforated wall extending axially between the first axial end and the second axial end and forming a filtration screen covering the actuation fluid inlet and positioned upstream of the actuation fluid inlet to trap particulates in incoming actuation fluid.

In another aspect, a method of making a fuel injector assembly includes snap-fitting a first axial end of an annular filter defining a longitudinal axis with a first body component of a fuel injector, and slip-fitting a second axial end of the annular filter with a second body component of the fuel injector. The method further includes engaging a first set of threads of the first body component with a second set of threads of the second body component to attach the first body component to the second body component. The method still further includes positioning, by way of the engagement of the first set of threads with the second set of threads, a perforated wall of the annular filter forming a filtration screen upstream of an actuation fluid inlet to trap particulates in incoming actuation fluid.

In still another aspect, a filter for a fuel injector includes an annular body defining a longitudinal axis extending between a first axial end and a second axial end of the annular body. The first axial end includes a snap shoulder extending circumferentially around the longitudinal axis and radially inward toward the longitudinal axis, for snap-fitting the first axial end with a first body component of the fuel injector. The second axial end includes an end band extending circumferentially around the longitudinal axis, for slip-fitting the second axial end with a second body component of the fuel injector. The annular body further includes a perforated wall extending circumferentially around the longitudinal axis and axially between the first axial end and the second axial end. The perforated wall forms a filtration screen for covering a actuation fluid inlet in the fuel injector and positioning upstream of the actuation fluid inlet to trap particulates in incoming actuation fluid.

BRIEF DESCRIPTION OF THE DRAWINGS

FIG. 2 is a partially sectioned side diagrammatic view of a fuel injector assembly, according to one embodiment;

FIG. 3 is a diagrammatic view of a portion of the fuel injector assembly of FIG. 2;

DETAILED DESCRIPTION

Figure 1:
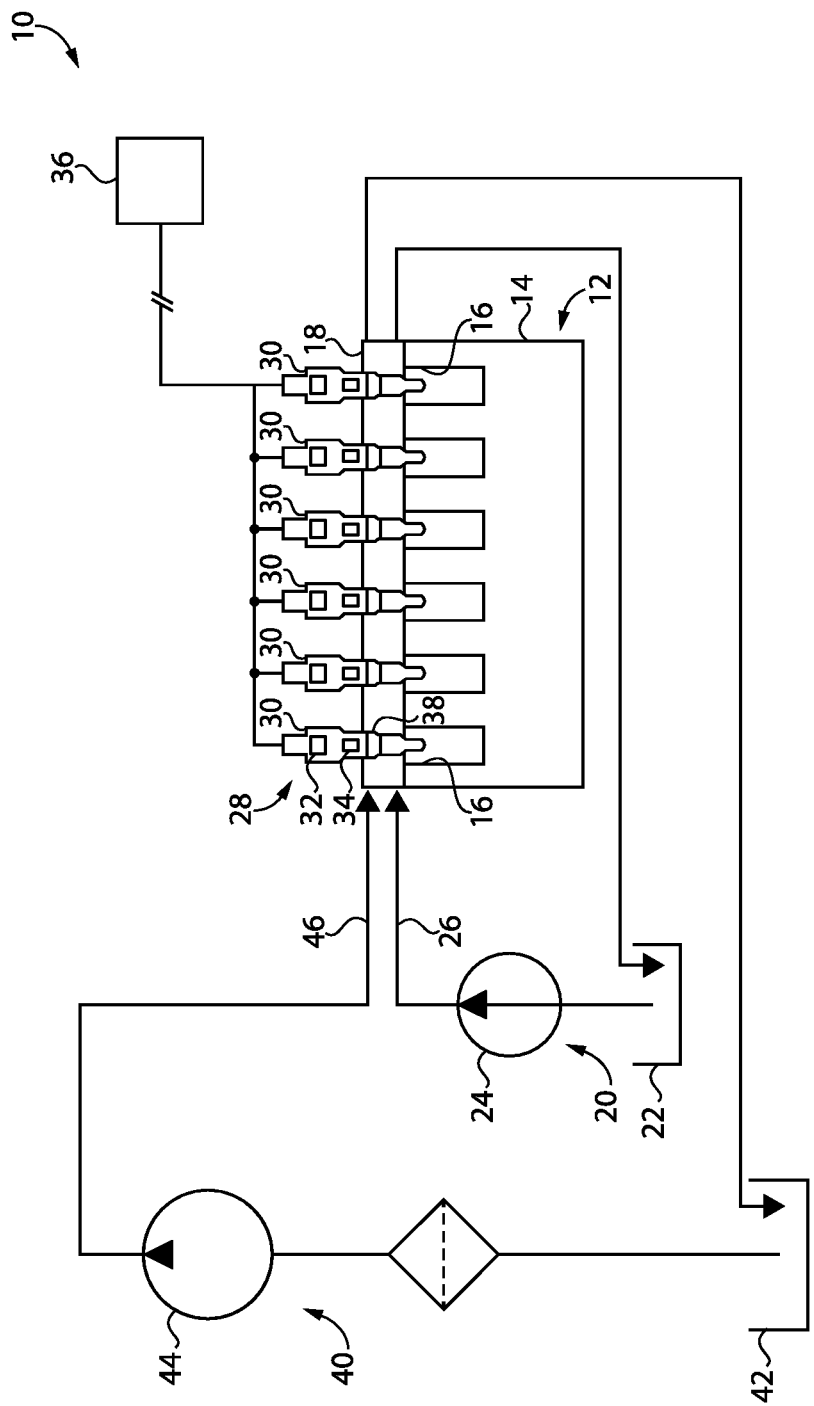
FIG. 1 is a diagrammatic view of an engine system, according to one embodiment.

Referring to FIG. 1, there is shown an internal combustion engine system 10 according to one embodiment, and including an engine 12 having a cylinder block 14 with a plurality of cylinders 16 formed therein. Engine 12 can include a compression-ignition diesel engine in one embodiment, and having cylinders 16 of any number and in any suitable arrangement such as an in-line configuration, a V-configuration, or still another. Engine 12 could operate on a liquid fuel such as diesel distillate fuel, biodiesel, blends of these, or still others. Engine 12 could also include any of a variety of dual fuel engines, such as a dual liquid and gaseous fuel engine. A plurality of pistons (not shown) will be positioned one within each of cylinders 16 and structured to reciprocate in response to combustion of fuel and air in cylinders 16 to rotate a crankshaft in a generally conventional manner. Engine 12 further includes an engine head 18 structured to house gas exchange valves for cylinders 16, again in a generally known manner.

Engine system 10 also includes a fuel system 20 having a fuel supply 22 such as a conventional fuel tank, a fuel pump 24, and a fuel supply conduit 26 structured to convey fuel pumped by way of fuel pump 24 into engine head 18. Fuel system 20 also includes a plurality of fuel injector assemblies 28 positioned within engine head 18, and each extending into one of cylinders 16. Description herein of any one component in the singular should be understood by way of analogy to refer to any of the corresponding plurality of components that might be used in engine system 10. Each of fuel injector assemblies 28 includes a fuel injector 30, which may be electronically controlled by way of an electronic control unit or ECU 36 according to any of great variety of different fuel injector control strategies. Fuel injector 30 includes an injection control valve 32 which may be electrically actuated, and a fuel pressurization mechanism such as a plunger 34 structured to pressurize fuel to a suitable injection pressure within fuel injector 30. Engine system 10 further includes an actuation fluid system 40 including a fluid supply 42, a pump 44, and a fluid conduit 46 structured to convey actuation fluid from pump 44 to engine head 18 for delivery to fuel injectors 30. It will be appreciated that engine system 10 includes a two fluid system where fuel for injection is delivered to each of the plurality of fuel injectors 30, and each of the plurality of fuel injectors is actuated at least in part by way of a fluid delivered by way of actuation fluid system 40. Pump 44 can pressurize the actuation fluid to enable the actuation fluid to drive plunger 34 to pressurize the fuel in a generally known manner, and to hydraulically control and/or operate other components. In one implementation, the actuation fluid is engine oil, however, in other embodiments the actuation fluid could be a different type of oil, the same fuel that is injected, or even engine coolant to name a few examples. In still other embodiments, engine system 10 could be a single fluid system and fuel to be injected could also serve as the actuation fluid, within a single fluid circuit. Moreover, rather than pressurizing fuel for injection by way of fluid-actuated plunger 34, in other instances plunger 34 might be cam-actuated, or fuel pressurized for injection outside of fuel injector 30. Each fuel injector assembly 28 further includes an actuation fluid filter 38 structured to trap particulates in incoming actuation fluid. As will be further apparent from the following description, filter 38 can be structured for simple and straightforward assembly with the corresponding fuel injector 30 and robust filtering of particulates. It has been discovered that a pressurization pump such as fluid pump 44 can be a source of debris which it is desirable to avoid admitting into fuel injector 30. Pump 44 could include any of a variety of pumps such as an inlet-metered piston pump or an outlet-metered piston pump, although the present disclosure is not thereby limited.

Referring also now to FIG. 2, there is shown a sectioned view through fuel injector assembly 28 illustrating additional details. Fuel injector 30 may be constructed from a plurality of different body components, such as a first body component that includes a nozzle case 48 having a first set of threads or nozzle case threads 50, and second body component that includes an injector body 52 that is attached to nozzle case 48. Other body components (not numbered) can house control valve 32 and be attached to injector body 52 or other components in any suitable arrangement. The terms "first" and "second" and other numerical identifiers are used herein purely for descriptive convenience. Injector body 52 has formed therein an actuation fluid inlet 54, and an actuation fluid passage 56 extending in a downstream direction from actuation fluid inlet 54. Injector body 52 further includes a second set of threads or injector body threads 58 engaged with nozzle case threads 50. In the illustrated embodiment, nozzle case threads 50 include single start internal threads, and injector body threads 58 include single start external threads. The present disclosure is nevertheless not to be understood as limited to any particular thread design, thread number, thread pitch, or any other thread characteristic.

Referring now also to FIG. 3, fuel injector assembly 28 also includes an annular filter 38 defining a longitudinal axis 100. It can be seen that annular filter 38 extends axially between injector body 52 and nozzle case 48 and is positioned so as to cover actuation fluid inlet 54, and is thus positioned upstream of actuation fluid inlet 54 to trap particulates in incoming actuation fluid. Injector body 52 further includes a first seal seating shoulder 94 and a second seal seating shoulder 96. A first seal 98 such as a conventional O-ring seal is positioned upon seal seating shoulder 94, and a second seal 99 such as another O-ring is positioned upon seal seating shoulder 96. When installed for service in engine 12, seal 98 and seal 99 can seal against engine head 18 and confine a flow of actuation fluid between them, which actuation fluid is supplied to actuation fluid inlet 54 through annular filter 38.

Fuel injector 30 further includes a tip piece 60 having a nozzle cavity 62 and a plurality of nozzle outlets 66 formed therein. An outlet check 64 is movable within tip piece 60 to open and close nozzle outlets 66 in a generally known manner responsive to a pressure of actuation fluid in a control chamber 76. Control chamber 76 may be formed in a stack piece 70 of a stack 68. Stack 68 further includes another stack piece or spacer 74 having a plunger cavity 82 formed therein. Engagement of nozzle case threads 50 and injector body threads 58 clamps stack 68 between injector body 52 and nozzle case 38. Stack 68 may be held in axial compression in fuel injector 30 by way of the clamping, and can include additional stack pieces including a stack piece 72 structured as an orifice plate to provide for connecting actuation fluid to control chamber 76, and for conveying fuel to nozzle cavity 62.

Fuel injector 30 further has formed therein a fuel path 78 extending by way of plunger cavity 82 between a fuel inlet 80 in nozzle case 48 and nozzle cavity 62. Clamping stack 68 between injector body 52 and nozzle case 48 creates and seals fluid connections that form fuel path 78. Plunger 34 is positioned at least partially within stack 68 and includes a plunger actuation surface 86 and a fuel pressurization surface 84. Fuel injector 30 further has a low pressure outlet 90 formed therein and plunger actuation surface 86 is exposed to actuation fluid between actuation fluid inlet 54 and low pressure outlet 90. Fuel pressurization surface 84 is fluidly between fuel inlet 80 and nozzle outlets 66. An actuation fluid path 88 is formed by actuation fluid inlet 54, incoming actuation passage 88, and low pressure outlet 90. The actuation fluid path 88 can be further understood to extend to control chamber 76. Control valve 32 is movable between a first position at which actuation fluid inlet 54 is fluidly connected to control chamber 76, and a second position at which actuation fluid inlet 54 and control chamber 76 are fluidly connected to low pressure outlet 90. A spool valve 92 is associated with control valve 32 and movable between a first position at which plunger actuation surface 86 is exposed to a fluid pressure of actuation fluid inlet 54, and a second position at which plunger actuation surface 86 is exposed to a fluid pressure of low pressure outlet 90. The arrangement of control valve 32, spool 92, plunger 34, and outlet check 64 is generally known.

Figure 4:
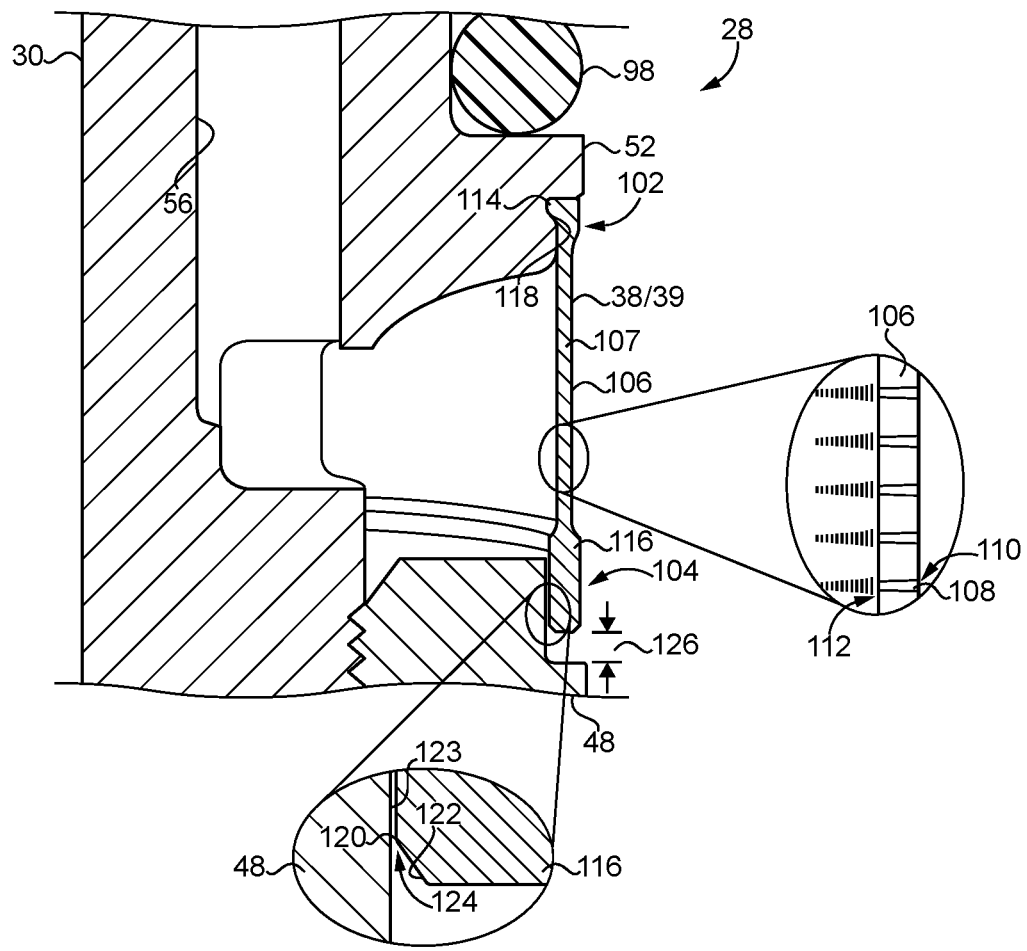
FIG. 4 is a sectioned view of a portion of the fuel injector assembly of FIG. 2, including detailed enlargements.

Referring also now to FIG. 4, annular filter 38 includes an annular filter body 39, having a first axial end 102 snap-fitted with a first body component of fuel injector 30 including one of nozzle case 48 or injector body 52, and a second axial end 104 slip-fitted with a second body component of fuel injector 30 including the other of nozzle case 38 or injector body 52. Annular filter 38 further includes a perforated wall 106 extending axially between first axial end 102 and second axial end 104. Perforated wall 106 may extend circumferentially around longitudinal axis 100, and forms a filtration screen 107 covering actuation fluid inlet 54 and positioned upstream of actuation fluid inlet 54 to trap particulates in incoming actuation fluid. FIG. 4 includes a detailed enlargement of part of filtration screen 107, illustrating a plurality of perforations 108 formed therein. Perforations 108 can be arranged in any suitable pattern and can have any suitable number. In one implementation, a distribution of perforations 108 is substantially circumferentially and axially uniform in perforated wall 106, with perforations 108 extending radially through perforated wall 106. A number of perforations 108 could be in the thousands or the tens of thousands, or potentially even still higher. Perforations 108 can be laser drilled in one practical approach, and can further be tapered to narrow outwardly, or to narrow inwardly such that an inlet end 110 at a radially outward location is larger in diameter than an outlet end 112 of each perforation 108 at a radially inward location.

It can further be noted from FIG. 4 that first axial end 102 includes an inwardly projecting snap-shoulder 114. Snap-shoulder 114 can extend circumferentially around longitudinal axis 100. Second axial end 104 includes an end band 116 that also extends circumferentially around longitudinal axis 100. Injector body 52 may further include a groove 118 formed therein, extending circumferentially around longitudinal axis 100 and receiving snap-shoulder 118 snap-fitted with injector body 52 within groove 119. As used herein, the term "snap-fitted" or related terminology should be understood to be a fit between parts that are formed by interlocking features, attached together by way of elastic deformation, meaning that material of first axial end 102, namely, snap-shoulder 114, experiences hoop strain and deforms to enable snap-fitting of first axial end 102 with injector body 52. An interference fit relying on friction alone is not a snap fit.

The described snap-fitting fixes a location of annular filter 38 relative to injector body 52. Another way to understand this feature is that annular filter 38 is located for assembly, and during making of fuel injector assembly 28 by way of the snap-fitting of snap shoulder 114 within groove 118. Second axial end 104 is not fixed in location relative to nozzle case 48, but will instead be located relative to nozzle case 48 by way of the engagement of nozzle case threads 50 and injector body threads 58. It can therefore be appreciated that during making fuel injector assembly 28 annular filter 38 can be attached to injector body 52 prior to attaching injector body 52 to nozzle case 48. With injector body 52 and annular filter 38 forming an assembly injector body 52 can be inserted into nozzle case 38 and nozzle case threads 50 and injector body threads 58 engaged, with nozzle case 48 and injector body 52 rotated relative to each other to attach the parts, clamp stack 68, and simultaneously slip-fit second axial end 104, namely, end band 116 about nozzle case 38. The term "slip-fitting" and related terminology means that a clearance, at least nominally, extends between the slip-fitted parts.

FIG. 4 includes another detailed enlargement illustrating an interface between end band 116 and nozzle case 48. End band 116 includes an inner surface 120 and a lead-in chamfer 122 adjoining inner surface 120. Inner surface 120 has a radial clearance 124 with an outer surface 123 of nozzle case 48. Radial clearance 124 can include a clearance size equal to or less than a perforation size, at least on average, of perforations 108 within perforated wall 106. In an implementation, a perforation size of perforations 108, meaning a minimum diameter dimension at outlet end 112, may be about 100 microns or 0.100 millimeters. In a refinement, the perforation size may be about 75 microns or 0.075 millimeters. As used herein, the term "about" should be understood in the context of conventional rounding to a consistent number of significant digits. Accordingly, "about 100" means from 50 to 145, "about 75" means from 74.5 to 75.4, and so on. The size of clearance 124 may be such that end band 116 and nozzle case 48 together form an edge filter, with perforated wall 106 forming a two-dimensional screen filter. It will further be appreciated in view of the present discussion that employing a slip-fit between second axial end 104 and nozzle case 48 can loosen any requirements for tightly controlling certain dimensional and proportional attributes of annular filter 38. In other words, since no solid connection or stop is necessary between end band 116 and nozzle case 48, threading together nozzle case 48 and injector body 52 clamps together and locates the components in a desired manner without having to accommodate or locate second axial end 104 with great precision. An axial clearance 126 between end band 116 and a shoulder of nozzle case 48 is shown in FIG. 4, and axial clearance 126 may be reduced in size, to a clearance size greater than zero, by way of the engagement of nozzle case threads 50 and injector body threads 58 during making fuel injector assembly 28.

Figure 5:
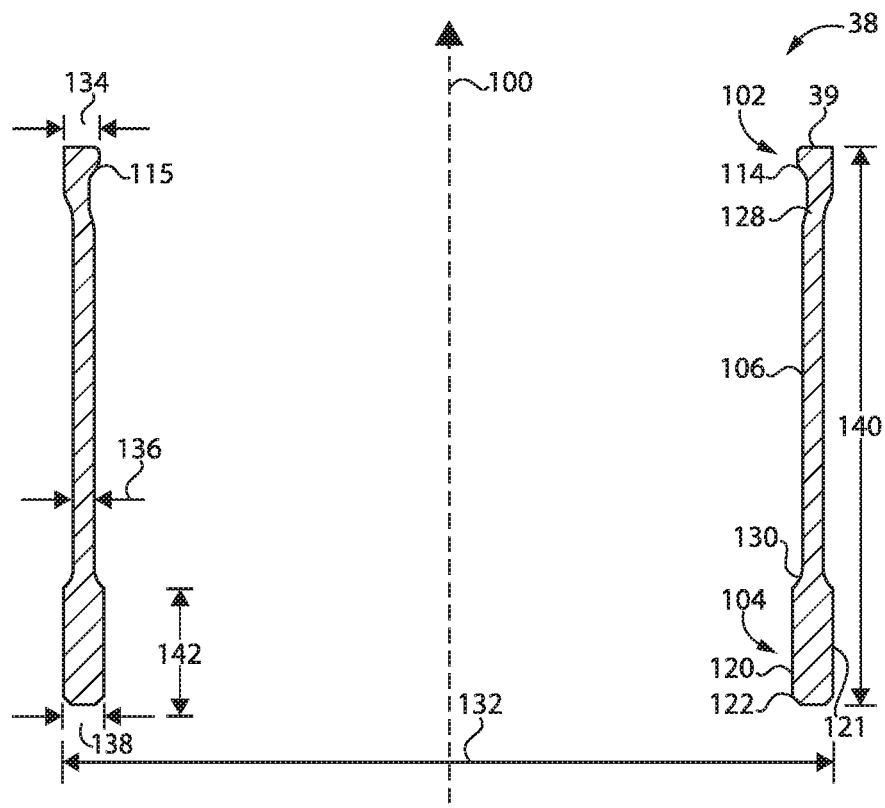
FIG. 5. is a sectioned side diagrammatic view of a filter for a fuel injector, according to one embodiment.
Figure 6:
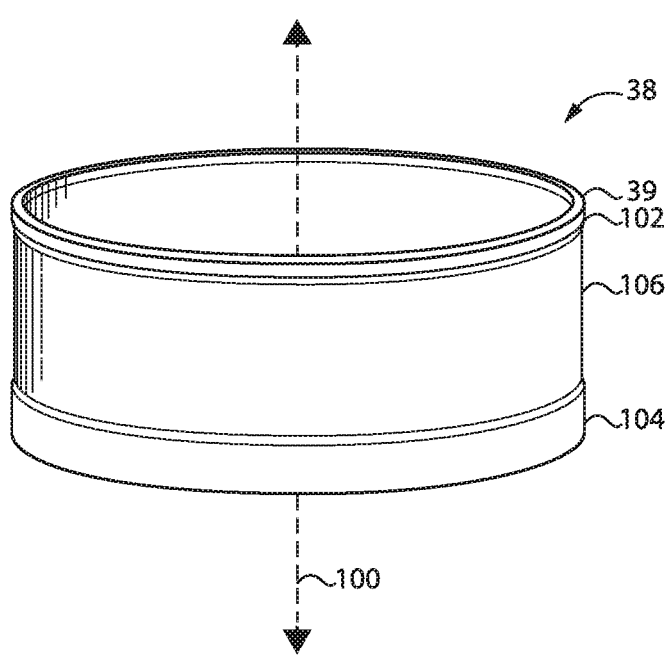
FIG. 6 is a pictorial view of the filter of FIG. 5.

Referring now also to FIG. 5 and FIG. 6, there shown further features of annular filter 38 and in greater detail. Annular filter 38, including annular filter body 39, defines an outer diameter dimension 132, and an axial length dimension 140. Outer diameter dimension 132 may be greater than axial length dimension 140, such as about two times greater or more. Annular filter body 39 further defines another axial length dimension 142 of end band 116. End band 116 can be structured such that inner surface 120 and outer surface 121 are each cylindrical and concentric with one another. A radial thickness 138 between outer surface 121 and inner surface 120 may be less than axial length dimension 142, such as about 50% or less of axial length dimension 142. It can further be noted that annular body 39 includes a first neck portion 128 narrowing in diameter in an axially inward direction and transitioning between first axial end 102 and perforated wall 106, and a second neck portion 130 narrowing in diameter in an axially inward direction and transitioning between second axial end 104 and perforated wall 106. Annular body 39 further may have a radial thickness 136 within perforated wall 106 that is less than a radial thickness 134 of first axial end 102 and less than radial thickness 138. Lead-in chamfer 122 is oriented at an angle relative to longitudinal axis 100 and extends circumferentially around longitudinal axis 100. Lead-in chamfer 122 can assist in piloting annular filter 38 about nozzle case 48 during slip-fitting annular filter 38 with nozzle case 48. Chamfer 122 might be oriented at an angle relative to longitudinal axis 100, for instance an angle opening in an axially outward direction away from second axial end 104, that is from about 30° to about 60°, although the present disclosure is not thereby limited. Each of snap-shoulder 114 and end band 116 is radially set off from perforated wall 106, meaning that material of snap shoulder 114 and material of end band 118 is positioned in space radially inward or radially outward of perforated wall 106. The radial set off can be in both a radially inward direction and a radially outward direction. Also shown in FIG. 5 is an inner shoulder surface 115 of snap shoulder 114. Surface 115 may have an angular contour, or a rounded contour approximately as shown, to assist in snapping in to groove 118, which may be shaped in a generally mirror image manner. Neck 128 may flex somewhat as the snap fit attachment is being made.

INDUSTRIAL APPLICABILITY

As discussed above, making fuel injector assembly 38 can include snap-fitting first axial end 102 of annular filter 38 with a first body component of fuel injector 30, such as injector body 52. Making fuel injector assembly 28 can further include slip-fitting second axial end 104 of annular filter 38 with a second body component of fuel injector 30 such as nozzle case 38. As noted above, annular filter 38 may be attached to injector body 52 to form an assembly, which is then attached to nozzle case 38 by engaging a first set of threads, such as nozzle case threads 50, with a second set of threads, such as injector body threads 58 to attach nozzle case 48 to injector body 52. Perforated wall 106 of annular filter 38 may be positioned, by way of the engagement of nozzle case threads 50 and nozzle body threads 58, to form filtration screen 107 covering actuation fluid inlet 54 at a location upstream of actuation fluid inlet 54 to trap particulates in incoming actuation fluid. It can further be noted from the drawings that first seal seating shoulder 94 is positioned adjacent to groove 118 and abuts first axial end 102. Second seal seating shoulder 96 is positioned adjacent to end bond 118, and axial clearance 126 extends between end band 118 and second seal seating shoulder 96.

As discussed herein and depicted in the drawings, snap-fitting of first axial end 102 can include snap-fitting snap-shoulder 114 of annular filter 38 within groove 118 in injector body 52. Slip-fitting of second axial end 104 of annular filter 38 can include slip fitting end band 116 of annular filter 38 about outer surface 123 of nozzle case 48. In alternative embodiments, annular filter 38 could be snap-fitted to nozzle case 48, and slip-fitted with injector body 52, essentially the reverse of the configuration and methodology depicted in the drawings. Stack 68 is clamped between injector body 52 and nozzle case 48 by way of the engagement of nozzle case threads 50 with injector body threads 58. As also discussed above, slip fitting of end band 116 about outer surface 123 forms an edge filter in a practical implementation. Slip fitting of second axial end 104 occurs simultaneous with engagement of nozzle case threads 50 and injector body threads 58.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel injector assembly comprising:
a fuel injector including a nozzle case having a set of nozzle case threads, and an injector body, the injector body having formed therein an actuation fluid inlet and an actuation fluid passage extending in a downstream direction from the actuation fluid inlet, and including a set of injector body threads engaged with the set of nozzle case threads;
an annular filter defining a longitudinal axis and including a first axial end snap-fitted with one of the nozzle case or the injector body, such that the annular filter is fixed in location by the snap-fitting upon the one of the nozzle case or the injector body, and a second axial end slip-fitted with the other of the nozzle case or the injector body; and
the annular filter further including a perforated wall extending axially between the first axial end and the second axial end and forming a filtration screen covering the actuation fluid inlet and positioned upstream of the actuation fluid inlet to trap particulates in incoming actuation fluid.

2. The fuel injector assembly of claim 1 wherein the first axial end includes an inwardly projecting snap shoulder, and the second axial end includes an end band, and each of the snap shoulder and the end band extending circumferentially around the longitudinal axis.

3. The fuel injector assembly of claim 2 wherein the injector body has a groove formed therein and the snap shoulder is snap-fitted with the injector body within the groove.

4. The fuel injector assembly of claim 3 wherein the end band includes an inner surface and a lead-in chamfer adjoining the inner surface, and the inner surface has a radial clearance with the nozzle case that includes a clearance size equal to or less than a perforation size of perforations within the perforated wall.

5. The fuel injector assembly of claim 4 wherein the perforated wall forms a two-dimensional screen filter, and the end band and the nozzle case together form an edge filter.

6. The fuel injector assembly of claim 4 wherein the clearance is a radial clearance of about 0.075 millimeters or less.

7. The fuel injector assembly of claim 3 wherein the injector body includes a first seal seating shoulder positioned adjacent to the groove, and the nozzle case includes a second seal seating shoulder positioned adjacent to the end band, and wherein the first seal seating shoulder abuts the first axial end of the annular filter, and an axial clearance extends between the end band and the second seal seating shoulder.

8. The fuel injector assembly of claim 1 further comprising:
a stack including a tip piece having a nozzle cavity and a plurality of nozzle outlets formed therein; and
a plunger positioned at least partially within the stack and having a plunger actuation surface and a fuel pressurization surface.

9. The fuel injector assembly of claim 8 wherein:
the fuel injector has a low pressure outlet formed therein, and a valve movable between a first position at which the plunger actuation surface is exposed to a fluid pressure of the actuation fluid inlet, and a second position at which the plunger actuation surface is exposed to a fluid pressure of the low pressure outlet; and the nozzle case has a fuel inlet formed therein, and the fuel pressurization surface is fluidly between the fuel inlet and the plurality of nozzle outlets.

10. A method of making a fuel injector assembly comprising:

snap-fitting a first axial end of an annular filter defining a longitudinal axis with a first body component of a fuel injector including one of an injector body and a nozzle case;

fixing a location of the annular filter upon the one of an injector body and a nozzle case by way of the snap-fitting of the first axial end;

slip-fitting a second axial end of the annular filter with a second body component of the fuel injector including the other of an injector body and a nozzle case;

engaging a first set of threads of the first body component with a second set of threads of the second body component, to attach the first body component to the second body component; and positioning, by way of the engagement of the first set of threads with the second set of threads, a perforated wall of the annular filter forming a filtration screen upstream of an actuation fluid inlet in the injector body and an actuation fluid passage extending in a downstream direction from the actuation fluid inlet, and such that the filtration screen covers the actuation fluid inlet, to trap particulates in incoming actuation fluid.

11. The method of claim 10 wherein the snap-fitting of the first axial end of the annular filter includes snap-fitting a snap shoulder of the annular filter within a groove in an injector body, and the slip-fitting of the second axial end of the annular filter includes slip-fitting an end band of the annular filter about an outer surface of a nozzle case.

12. The method of claim 11 further comprising clamping a stack including a tip piece having a nozzle cavity and a plurality of nozzle outlets formed therein and a spacer having a plunger cavity formed therein, between the injector body and the nozzle case by way of the engagement of the first set of threads with the second set of threads.

13. The method of claim 12 further comprising forming a fuel path extending by way of the plunger cavity between a fuel inlet in the nozzle case and the nozzle cavity by way of the clamping of the stack between the injector body and the nozzle case.

14. The method of claim 11 further comprising forming an edge filter with the end band and the nozzle case by way of the slip-fitting of the end band about the outer surface of the nozzle case.

15. The method of claim 11 wherein the slip-fitting of the second axial end occurs simultaneous with the engagement of the first set of threads with the second set of threads.

16. The method of claim 15 wherein the annular filter is fixed in location relative to the injector body by way of the snap-fitting of the first axial end, and further comprising locating the annular filter relative to the nozzle case by way of the engagement of the first set of threads with the second set of threads.

17. The method of claim 16 further comprising reducing a size of an axial clearance between the end band and the nozzle case, to a clearance size greater than zero, by way of the engagement of the first set threads with the second set of threads.

* * * * *